Patented Feb. 1, 1944

2,340,355

UNITED STATES PATENT OFFICE 2,340,355

PROCESS FOR BREAKING PETROLEUM EMULSIONS

Arthur F. Wirtel, Kirkwood, Mo., assignor to Petrolite Corporation, Ltd., Wilmington, Del., a corporation of Delaware No Drawing. Application April 27, 1942, Serial No. 440,753

8 Claims. (Cl. 252—340)

This invention relates primarily to the resolution of petroleum emulsions.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned, is of significant value in removing impurities, particularly inorganic salts, from pipeline oil.

The composition of matter used as the demulsifier of our process is a polyhydroxyacetic acid derivative of a high molal detergent-forming monocarboxy acid. The unhyphenated expression "polyhydroxyacetic acid" is employed to refer to polymeric derivatives of hydroxyacetic acid in the same way that polyricinoleic acid refers to polymeric derivatives of ricinoleic acid. Such acids are obviously ester acids produced by self-esterification.

The constitution of such polyhydroxyacetic acids and their relationship to hydroxyacetic acid is readily shown by the following formulas:

OHCH$_2$COOH
OHCH$_2$COOCH$_2$COOH
OHCH$_2$COOCH$_2$COOCH$_2$COOH
OHCH$_2$COOCH$_2$COOCH$_2$COOCH$_2$COOH
OHCH$_2$COOCH$_2$COOCH$_2$COOCH$_2$COOCH$_2$COOH
OH(CH$_2$COO)$_n$H ($n$ being at least 2 and not over 10).

The expression "detergent-forming monocarboxy acids" has been frequently employed in the literature to designate certain high molal acids having at least 8 and not more than 32 carbon atoms and characterized by the fact that they combine with alkali to form soap or soap-like materials. The commonest examples are higher fatty acids derived from animal, vegetable, or marine sources. Other well-known examples include resinic acids, such as abietic acid, naturally-occurring petroleum acids, such as naphthenic acids, oxidized petroleum acids, such as those obtained by the oxidation of petroleum hydrocarbons, waxes and the like, and from certain naturally-occurring waxes. Such monocarboxy detergent-forming acids may be cyclic or acyclic. They may be saturated or unsaturated. Included also are derivatives which do not eliminate the soap-forming property and which are obviously chemical equivalents of the unmodified acid. For instance, chlorinated oleic acid will serve as satisfactorily as oleic acid. Hydrogenated abietic acid is as satisfactory as the material prior to hydrogenation. Brominated naphthenic acid is as satisfactory as the naphthenic acid itself. This also applies to similar derivatives obtainable from oxidized petroleum acids, wax acids, etc.

Some of the acids contain an alcoholic hydroxyl group as part of the acyl radical. For instance, acids such as ricinoleic acid, diricinoleic acid, hydroxystearic acid, hydroxylated acids derived by the oxidation of petroleum, hydroxylated acids derived by chlorination of an acid and subsequent reaction with caustic soda, etc. Such hydroxylated acids can react with hydroxyacetic acid, if, in the form of an acid, or in the form of an ester in which there is no hydroxyl group present as part of the alcoholic residue. For instance, ricinoleic acid, ethyl ricinoleate, ethylene glycol diricinoleate, etc. can react with hydroxyacetic acid by virtue of the alcoholic hydroxyl group which is part of the acyl radcial.

What has been said in regard to ethylene glycol diricinoleate applies with equal force and effect to monoricinolein, diricinolein, etc. Such type of compound can combine with hydroxyacetic acid by virtue of the alcoholic hydroxyl group which is part of the acyl radical, or the alcoholic hydroxyl group, which is part of the alcoholic residue. Obviously, such reactivity is also characteristic of compounds such as monostearin, distearin, mono-olein, diolein, mononaphthenin, dinaphthenin, and similar esters, such as ethylene glycol mono-oleate, diethylene glycol monostearate, etc. Briefly, then, the compounds contemplated for reaction with hydroxyacetic acid include three types, i. e.:

(a) The reactive hydroxyl group is present in the acyl radical only;

(b) The reactive hydroxyl group is present as a constituent of the alcoholic residue only; and (c) The reactive hydroxyl group is present both in the acyl position and in the alcoholic residue position.

Attention is directed to the co-pending application of Melvin DeGroote, Bernhard Keiser and Arthur F. Wirtel, Serial No. 440,749, filed April 27, 1942. Said aforementioned co-pending application is concerned with a process for breaking petroleum emulsions of the water-in-oil type, characterized by subjecting the emulsion to the action of a demulsifying agent comprising a drastically-oxidized hydroxyacetylated ricinoleic acid compound selected from the class consisting of castor oil, tririconolein, diricinolein, monoricinolein, superglycerinated castor oil, castor oil estolides, polyricinoleic acid and ricinoleic acid.

In other words, in said aforementioned co-pending application there is employed as an intermediate material a compound or composition of matter, which, in the present instance, also serves as an intermediate for making the demulsifying agent of the herein contemplated process for breaking petroleum emulsions. Stated in another way, the intermediate product, which is subjected to further reaction, for instance, drastic oxidation, as described in said aforementioned co-pending application, is herein employed after a further hydroxyacetylation reaction as a demulsifying agent.

Attention is directed to the co-pending application of Arthur F. Wirtel, and Charles M. Blair, Jr., Serial No. 440,752, filed April 27, 1942. Said last-mentioned co-pending application is concerned with a process for breaking petroleum emulsions of the water-in-oil type, characterized by subjecting the emulsion to the action of a demulsifier comprising a hydroxyacetylated high molal detergent-forming monocarboxy acid compound; said compound, prior to hydroxyacetylation, being selected from the class consisting of acids containing at least one hydroxyl group as part of the high molal acyl radical, esters free from any hydroxyl group in the alcoholic residue, but containing at least one hydroxyl as part of the high molal acyl radical, and esters containing at least one hydroxyl group in the alcoholic residue; the acyl radical of said high molal acids having at least 8 and not more than 32 carbon atoms.

The polyhydroxyacetylated derivatives herein contemplated as new compositions of matter, and particularly for use as demulsifiers, are obtained by the reaction or reactions between polyhydroxacetic acid and the types of high molal detergent-forming monocarboxy acid compounds, described in said aforementioned Wirtel and Blair co-pending application. The actual steps of manufacture may involve procedure other than the use of polyhydroxyacetic acid, for instance, a suitable reactant might be subjected to repeated hydroxyacetylation with the monomeric hydroxyacetic acid. In such instance hydroxyacetic acid is used as a successive reagent or reactant, and the initial product of hydroxyacetylation, i. e., hydroxyacetylated castor oil or the like, serves as a primary material or reactant in the same way as it is employed in the aforementioned De Groote, Keiser and Wirtel co-pending application. In that particular instance air, oxygen or ozone is the reactant or reagent employed to combine with hydroxyacetylated castor oil or the like. In the present instance I employ additional amounts of hydroxyacetic acid so that the latter serves as the reactant equivalent of oxygen or ozone, as employed in the manufacture of the componds or compositions described in said aforementioned De Groote, Keiser and Wirtel co-pending application.

Once more I desire to emphasize that it is immaterial as to how the particular products or compounds are made. Thus, one may hydroxyacetylate compounds which already have the hydroxyacetyl radical present. Or, instead of so doing, by a multi-stage process, the entire procedure can be carried out in a single stage or operation. Furthermore, hydroxyacetic acid may be polymerized and such polyhydroxyacetic acid employed as a reactant. I furthermore, want to emphasize that the polyhydroxylated compounds herein contemplated are not limited to types derived from reactants of the kind disclosed in the aforementioned De Groote, Keiser and Wirtel application, but include the broader class described in the aforementioned Wirtel and Blair application.

Insofar that I prefer to employ hydroxylated derivatives derived from fatty acids or esters thereof, and particularly, unsaturated fatty acids, and most preferably, derivatives of castor oil, I will refer in substantially verbatim language to the description in said aforementioned De Groote, Keiser and Wirtel co-pending application which is concerned with products obtained by reaction between hydroxyacetic acid and castor oil, or related compounds. Furthermore, additional matter appearing substantially in verbatim form as it appears in the aforementioned Wirtel and Blair application, will also be included for convenience.

The production of hydroxyacetylated castor oil is comparatively simple and is comparable to the manufacture of acetylated castor oil, except that hydroxyacetic acid appears to be more reactive than acetic acid. For instances, any suitably selected amount of castor oil may be treated with the appropriate amount of hydroxyacetic acid under conditions to promote esterification and remove any water formed. The usual procedures for promotion of esterification are well known, and involve one or more of the following: Employment of a temperature high enough to eliminate any water formed, for instance, 120–180° C.; sometimes the presence of a strong acid, such as a benzene-sulfonic acid in small amounts acts as a catalyst; sometimes it is expedient to pass an inert dried gas through the reacting mixture; at other times estereification may be conducted in the presence of a high boiling water-insoluble solvent, such as xylene or the like, which assists in removing the water in the form of vapors; the condensate so derived, both from the water vapor and solvent vapor is separated by gravity; and the solvent returned to the reacting chamber for further use.

The selection of suitable amounts of reactants in the manfacture of hydroxyacetylated castor oil is, of course, simple. Castor oil may be analyzed for its triricinolein content by determination of its hydroxyl or acetyl value. Such determination, of course, includes any hydroxy acid compounds other than ricinoleic acid present, but this is immaterial for the present purpose. On the average, castor oil will indicate 85–92% of triricinolein. For convenience in the present instance one may consider triricinolein as if it were a trihydric alcohol, and thus, one may obtain mono - hydroxyacetylated triricinolein, di - hydroxyacetylated triricinolein, and tri-hydroxyacetylated triricinolein. For practical purposes, of course, there is no economical justification for trying to obtain a technically pure triricinolein and subjecting such material to hydroxyacetylation instead of employing castor oil.

Thus, the product particularly contemplated as a reactant in the present instance, is the compound or compounds obtained by the hydroxyacetylation of castor oil. For purposes of convenience, reference will be made to mono-hydroxyacetylated castor oil, di-hydroxyacetylated castor oil, and tri-hydroxyacetylated castor oil. Examination of the reaction between hydroxyacetic acid and castor oil indicates that water is formed and must be removed. Actually, the water formed may not necessarily be removed instantly, and thus may undergo certain other obvious reactions. Likewise, for reasons of economy, it may be desirable to use a highly concentrated hydroxyacetic acid instead of the anhydrous material as the selected reactant. In such instances, the water would readily enter into hydrolytic reaction with the castor oil, and thus, the product or composition which is actually acetylated may even contain glycerol, in addition to triricinolein. It is not intended, in the present instance, to include a product or compound such as hydroxyacetylated glycerol, but it is to be noted that such material may be present cogenerically, for reasons indicated. Specific reference to the raw materials herein contemplated, and particularly for use as preferred reactants include the hydroxyacetylated derivatives of ricinoleic acid compounds. These are now suitably exemplified by reference to triricinolein, diricinolein, monoricinolein, and ricinoleic acid, and most particularly, the cogeneric mixture obtained by the hydroxyacetylation of castor oil, including specific members mentioned subsequently.

Although it is believed that in view of what has been said, that no further description is necessary in regard to the manufacture of polyhydroxylated derivatives, the following examples are included by way of illustration:

In the present instance, as differentiated from the aforementioned Wirtel and Blair application, I am interested in polyhydroxyacetylated derivatives, and thus, reference will be limited specifically to the further hydroxyacetylation of polyhydroxyacetylated castor oil or triricinolein. Note that the hyphenated expression "poly-hydroxyacetylated" is limited to the type of compound wherein the monomeric hydroxyacetyl radical is introduced two or more times.

*Hydroxyacetylated castor oil, Example 1*

1,000 pounds of castor oil (triricinolein content 88%) is treated with 333 pounds of concentrated hydroxyacetic acid containing 30% of water. The reaction is conducted at 200–250° C. for approximately 2 hours. Completeness of reaction is indicated by the fact that elimination of water practically ceases, decrease in acid value and hydroxyl value of mixture, and elimination of free hydroxyacetic acid. The procedure is conducted in the usual reaction vessel of the kind employed for esterification, and may be constructed of any material which is resistant to the reactants. The amount of hydroxyacetic acid selected in the present instance is calculated so as to give substantially a tri-hydroxyacetylated castor oil.

*Hydroxyacetylated castor oil, Example 2*

The same procedure is followed as in Example 1, preceding, except that anhydrous hydroxyacetic acid is employed and water is removed immediately upon formation. The product so obtained represents hydroxyacetylated castor oil, or more especially, hydroxyacetylated triricinolein, in the presence of a minimum amount of hydroxyacetylated cogeners.

*Hydroxyacetylated ethylene glycol mono (di-hydroxy) stearate*

One pound mole of ethylene glycol is reacted with one pound mole of dihydroxystearic acid, which in turn is reacted with three pound moles of anhydrous hydroxyacetic acid and water is removed immediately upon formation.

*Hydroxyacetylated diethylene glycol mono (di-hydroxy) stearate*

The same procedure is followed as in the preceding example, except that the fractional ester, prior to hydroxyacetylation, is derived from diethylene glycol, instead of ethylene glycol.

*Hydroxyacetylated mono-olein*

One pound mole of mono-olein is reacted with two pound moles of anhydrous hydroxyacetic acid and water is removed immediately upon formation.

*Hydroxyacetylated di-olein*

The same procedure is followed as in the preceding example, except that one pound mole of anhydrous hydroxyacetic acid is reacted with one pound mole of di-olein.

*Hydroxyacetylated superglycerinated castor oil, Example 1*

Superglycerinated castor oil, consisting largely of monoricinolein, is treated with anhydrous hydroxyacetic acid into the ratio of three moles of the anhydrous acid for each mole of the superglycerinated castor oil.

*Hydroxyacetylated superglycerinated castor oil, Example 2*

The same procedure is employed, except that the superglycerinated castor oil employed is the kind characterized by the fact that the fatty raw material is diricinolein. The molal ratios remain the same.

*Hydroxyacetylated glycol ester, Example 1*

One pound mole of ethylene glycol mono-oleate is reacted with one pound mole of anhydrous hydroxyacetic acid.

*Hydroxyacetylated glycol ester, Example 2*

One pound mole of diethylene glycol mono-ricinoleate is treated with two pound moles of anhydrous hydroxyacetic acid.

In the above examples, and in fact, in all instances herein described, the functional equivalent of hydroxyacetic acid, such as the acyl chloride or anhydride, could be employed as well as the acid itself. This also applies, of course, to polyhydroxyacetic acid. For instance, the acyl chloride, if available, would serve as well as the acid itself, particularly when employed in the absence of water or moisture.

Having obtained the types of compounds illustrated by the previous examples, in which there are no unreacted hydroxyl groups present, except as part of the hydroxyacetyl radical, and provided there is present at least one hydroxyacetyl radical, the herein mentioned compounds are simply obtained by further hydroxyacetylation of such previously described reactants. Attention again is directed to the fact that any method of manufacture may be employed, and one is not limited to this particular procedure. For instance, polyhydroxyacetic acid might be esterified with glycerol in molal proportions, and the fractional esters so obtained might then be esterified with oleic acid, ricinoleic acid, naphthenic acid, abietic acid, a naturally-occurring wax acid, an oxidized petroleum acid, or the like. For purpose of illustration the following examples are included.

*Polyhydroxyacetylated compound, Example 1*

One pound mole of the tri-hydroxyacetylated castor oil obtained by complete reaction between one pound mole of castor oil and three pound moles of anhydrous hydroxyacetic acid is reacted further with three additional pound moles of anhydrous hydroxyacetic acid.

*Polyhydroxyacetylated compound, Example 2*

The same procedure is employed as in the preceding Example 1, except that 6 pound moles of anhydrous hydroxyacetic acid are employed in the reaction with the tri-hydroxyacetylated castor oil.

*Polyhydroxyacetylated compound, Example 3*

The same procedure is employed as in the preceding Example 1, except that 9 pound moles of anhydrous hydroxyacetic acid are employed in the reaction with the tri-hydroxyacetylated castor oil.

*Polyhydroxyacetylated compound, Example 4*

The same procedure is employed as in the preceding example 1, except that 15 pound moles of anhydrous hydroxyacetic acid are employed in the reaction with the tri-hydroxyacetylated castor oil.

*Polyhydroxyacetylated compound, Example 5*

Tri-hydroxyacetylated monoricinolein is substituted for tri-hydroxyacetylated castor oil (tri-ricinolein) in the preceding Examples 1 to 4, inclusive.

*Polyhydroxyacetylated compound, Example 6*

Tri-hydroxyacetylated diricinolein is substituted for tri-hydroxyacetylated castor oil (tri-ricinolein) in the preceding Examples 1 to 4, inclusive.

*Polyhydroxyacetylated compound, Example 7*

One pound mole of dihydroxyacetylated mono-olein is reacted with two pound moles of anhydrous hydroxyacetic acid.

*Polyhydroxyacetylated compound, Example 8*

The same procedure is followed as in the preceding example, except that an increased amount of hydroxyacetic acid, for instance, 4 to 10 pound moles, are employed instead of 2 pound moles.

*Polyhydroxyacetylated compound, Example 9*

One pound mole of hydroxyacetylated ethylene glycol mono-oleate is reacted with one pound mole of anhydrous hydroxyacetic acid.

*Polyhydroxyacetylated compound, Example 10*

The same procedure is employed as in the preceding example, except that increased amounts of anhydrous hydroxyacetic acid are employed. For instance, 2 to 10 pound moles instead of 1 pound mole.

The introduction of the radical

$$-(CH_2COO)_n-$$

in which $n$ is at least 2 and not over 10, obviously introduces hydrophile character into the compound under consideration. In some instances the material which is subjected to polyhydroxyacetylation may already be water-soluble or markedly hydrophile. In such instance the change in character by the introduction of the polyhydroxyacetyl radical may not be as pronounced as in the instances where the raw material, prior to hydroxyacetylation, is not water-soluble or water-miscible. In such instances polyhydroxyacetylation produces marked enhancement of the hydrophile properties and may render the product completely water-soluble. In the early stages such character is noted, by increased hydrotropic property. I have previously referred to the fact that a dried inert gas may be passed through the reaction mixture to hasten esterification. This is especially true if, instead of using anhydrous hydroxyacetic acid, one employs a 70% solution. Under such circumstances air may be employed, even though it is not an inert gas. In the event that an unsaturated fatty acid group or the like is present, a reaction would occur akin to the blowing of castor oil or the like. I have found the products so obtained to be just as satisfactory for numerous purposes, and particularly for demulsification. For this reason, in the present instance only, the hereto appended claims include the products obtained by drastic oxidation, for the reason that the determinative functional group is the hydroxyacetyl radical and not the changes produced primarily by drastic oxidation. Furthermore, the conventional procedure, i. e., hydroxyacetylation, with hydrated hydroxyacetic acid and employment of air during the procedure, is an ideal method for preparing compounds of the kind herein contemplated, and particularly as demulsifiers. In order to illustrate this particular feature, I include the following example:

1,000 pounds of castor oil are treated with 660 pounds of commercial hydroxyacetic acid (70% strength) for 8 hours, at 180–200 degrees Centigrade. The reacting mass is agitated during the reaction, and air is passed through the mixture to serve both for the purpose of removing the water present and the water formed, and also to serve to oxidize the ricinoleyl radical or hydroxyacetylated ricinoleyl radical, so that the product ultimately obtained is characterized by a lower iodine number, as compared with the iodine number of a similar compound obtained without oxidation. The iodine number is construed as being due entirely to the ricinoleyl radical, or hydroxy ricinoleyl radical, and the particular procedure employed for obtaining the iodine number should be conducted in the manner required to show this relationship. Actually, oxidation can be employed so that the iodine number is reduced by one-third, one-half, or even by two-thirds. Needless to say, the reactions that take place during such reduction in iodine number may be accompanied by other changes not indicated by this simple test.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents. Moreover, said material or materials may be used alone, or in admixture with other suitable well-known classes of demulsifying agents.

It is well-known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described.

I desire to point out that the superiority of the reagent or demulsifying agent employed in my herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

I particularly desire to point out that my preferred type of demulsifier is derived from unsaturated higher fatty acids, or higher fatty acid compounds. Such higher fatty acids include ricinoleic acid, oleic acid, linoleic acid, erucic acid, etc. One need not employ a single fatty acid, but may employ the naturally-occurring mixtures obtained by saponification or hydrolysis of naturally-occurring oils or fats, such as the mixed fatty acids derived from olive oil, teaseed oil, soyabean oil, cottonseed oil, linseed oil, fish oils, etc. Castor oil, of course, may be used without saponification or hydrolysis. The unsaturated fatty acids may be monoethylenic, or polyethylenic.

Such mixtures of unsaturated fatty acids may be converted into superglycerinated fats comparable to monoolein, or diolein, or may be converted into comparable esters having at least one free hydroxyl by reaction with various glycols and the like.

Drastic oxidation in this instance applies to oxidation by means of a gaseous oxygen-containing medium, i. e., air, oxygen, ozone, ozonized air, and the like. It does not include wet oxidation by means of permanganate, etc.

It is to be understood, of course, that all hydroxyacetyl radicals need not be converted into polyhydroxyacetyl radicals. For instance, one mole of trihydroxyacetylated triricinolein may be reacted with one or two moles of anhydrous hydroxyacetic acid, so as to form one or two polyhydroxyacetyl radicals.

I have found that the lower polymeric acids are the most desirable reactants and yield the most desirable demulsifying agents. It has been previously pointed out that the subsequent end indicating the degree of polymerization of the polyhydroxyacetic acid may vary from 2–10, but I particularly desire to use the type where $n$ has the value of 2, 3 or 4. Furthermore, in view of what has been said in the preceding paragraph, it is obvious that every polyhydroxyacetylated compound need not have present at least one polyhydroxyacetyl radical for each high molal acyl radical. However, I prefer the type, indeed much prefer the type, especially for demulsifying purposes, in which there is present at least one polyhydroxyacetyl radical for each high molal acyl radical.

I am aware of the fact that, although what has been said previously is concerned solely with linear polymers of hydroxyacetic acid, that at least in some instances, for example, derivatives of ricinoleic acid, or hydroxystearic acid, ricinoleic acid, aleuritic acid, etc., it may be possible that polymerization takes place in such a manner that at least some cyclic polymers are formed which are included as the obvious equivalent of the linear polymers.

Having thus described my invention, what I claim as new and desire to secure by Letters Patent is:

1. A process for breaking petroleum emulsions of the water-in-oil type, characterized by subjecting the emulsion to the action of a demulsifier comprising a polyhydroxyacetylated high molal detergent-forming monocarboxy acid compound; said compound, prior to polyhydroxyacetylation, being selected from the class consisting of acids containing at least one hydroxyl group as part of the high molal acyl radical, esters free from any hydroxyl group in the alcoholic residue, but containing at least one hydroxyl as part of the high molal acyl radical, and esters containing at least one hydroxyl group in the alcoholic residue; the acyl radical of said high molal acids having at least 8 and not more than 32 carbon atoms; each polyhydroxyacetyl radical present having at least two occurrences of the repetitious divalent radical ($CH_2COO$) and not more than ten such occurrences.

2. A process for breaking petroleum emulsions of the water-in-oil type, characterized by subjecting the emulsion to the action of a demulsifier comprising a polyhydroxyacetylated high molal detergent-forming monocarboxy acid compound; said compound, prior to polyhydroxyacetylation, being selected from the class consisting of acids containing at least one hydroxyl group as part of the high molal acyl radical, esters free from any hydroxyl group in the alcoholic residue, but containing at least one hydroxyl as part of the high molal acyl radical, and esters containing at least one hydroxyl group in the alcoholic residue; the acyl radical of said high molal acids having at least 8 and not more than 32 carbon atoms; each polyhydroxacetyl radical present having at least two occurrences of the repetitious divalent radical ($CH_2COO$) and not more than four such occurrences.

3. A process for breaking petroleum emulsions of the water-in-oil type, characterized by subjecting the emulsion to the action of a demulsifier comprising a polyhydroxyacetylated high molal detergent-forming monocarboxy acid compound; said compound, prior to polyhydroxyacetylation, being selected from the class consisting of acids containing at least one hydroxyl group as part of the high molal acyl radical, esters free from any hydroxyl group in the alcoholic residue, but containing at least one hydroxyl as part of the high molal acyl radical, and esters containing at least one hydroxyl group in the alcoholic residue; the acyl radical of said high molal acids having at least 8 and not more than 32 carbon atoms; each polyhydroxyacetyl radical present having at least two occurrences of the repetitious divalent radical ($CH_2COO$) and not more than four such occurrences; the number of such aforementioned polyhydroxyacetyl radicals present being at least equal to the number of the high molal acyl radicals present.

4. A process for breaking petroleum emulsions of the water-in-oil type, characterized by subjecting the emulsion to the action of a demulsifier comprising a polyhydroxyacetylated higher fatty acid compound; said compound, prior to polyhydroxyacetylation, being selected from the class consisting of acids containing at least one hydroxyl group as part of the high molal acyl radical; esters free from any hydroxyl group in the alcoholic residue, but containing at least one hydroxyl as part of the high molal acyl radical; and esters containing at least one hydroxyl group in the alcoholic residue; the acyl radical of said higher fatty acid having at least 8 and not more than 32 carbon atoms; each polyhydroxyacetyl radical present having at least two occurrences of the repetitious divalent radical ($CH_2COO$) and not more than four such occurrences; the number of such aforementioned polyhydroxyacetyl radicals present being at least equal to the number of the higher fatty acyl radicals present.

5. A process for breaking petroleum emulsions of the water-in-oil type, characterized by subjecting the emulsion to the action of a demulsifier comprising a polyhydroxyacetylated unsaturated higher fatty acid compound; said compound, prior to polyhydroxyacetylation, being selected from the class consisting of acids containing at least one hydroxyl group as part of the high molal acyl radical; esters free from any hydroxyl group in the alcoholic residue, but containing at least one hydroxyl as part of the high molal acyl radical; and esters containing at least one hydroxyl group in the alcoholic residue; the acyl radical of said unsaturated higher fatty acid having at least 8 and not more than 32 carbon atoms; each polyhydroxyacetyl radical present having at least two occurrences of the repetitious divalent radical ($CH_2COO$) and not more than four such occurrences; the number of such aforementioned polyhydroxyacetyl radicals present being at least equal to the number of the higher fatty acyl radicals.

6. A process for breaking petroleum emulsions of the water-in-oil type, characterized by subjecting the emulsion to the action of a demulsifier comprising a polyhydroxyacetylated unsaturated higher fatty acid compound; said compound being an acid containing at least one hydroxyl group as part of the high molal acyl radical and said acyl radical having at least 8 and not more than 32 carbon atoms; each polyhydroxyacetyl radical present having at least two occurrences of the repetitious divalent radical ($CH_2COO$) and not more than four such occurrences; the number of such aforementioned polyhydroxyacetyl radicals present being at least equal to the number of the unsaturated higher fatty acid acyl radicals present.

7. A process for breaking petroleum emulsions of the water-in-oil type, characterized by subjecting the emulsion to the action of a demulsifier comprising a polyhydroxyacetylated unsaturated higher fatty acid compound; said compound being an ester free from any hydroxyl group in the alcoholic residue, but containing at least one hydroxyl as part of the high molal acyl radical, and said acyl radical having at least 8 and not more than 32 carbon atoms; each polyhydroxyacetyl radical present having at least two occurrences of the repetitious divalent radical ($CH_2COO$) and not more than four such occurrences; the number of such aforementioned polyhydroxyacetyl radicals present being at least equal to the number of the unsaturated higher fatty acid acyl radicals present.

8. A process for breaking petroleum emulsions of the water-in-oil type, characterized by subjecting the emulsion to the action of a demulsifier comprising a polyhydroxyacetylated unsaturated higher fatty acid compound; said compound being an ester containing at least one hydroxyl group in the alcoholic residue and the acyl radical thereof having at least 8 and not more than 32 carbon atoms; each polyhydroxyacetyl radical present having at least two occurrences of the repetitious divalent radical ($CH_2COO$) and not more than four such occurrences; the number of such aforementioned polyhydroxyacetyl radicals present being at least equal to the number of the unsaturated higher fatty acid acyl radicals present.

ARTHUR F. WIRTEL.